United States Patent
Moray

[15] 3,699,942
[45] Oct. 24, 1972

[54] ADJUSTABLE VALVE STEM OIL SEALS FOR OLD AND NEW INTERNAL COMBUSTION ENGINES

[72] Inventor: Forest J. Moray, 1513 Books Avenue, Renton, Wash. 98055

[22] Filed: Feb. 17, 1971

[21] Appl. No.: 116,032

Related U.S. Application Data

[63] Continuation-in-part of Ser. No. 52,175, July 6, 1970, Pat. No. 3,577,972.

[52] U.S. Cl. .........123/188 P, 123/188 GL, 277/112, 277/126, 277/153
[51] Int. Cl. ...........................F01l 3/00, F16k 41/02
[58] Field of Search ......123/188 P, 188 SC, 188 GC; 277/33, 181, 93 R, 112, 126, 153

[56] References Cited

UNITED STATES PATENTS

| | | | |
|---|---|---|---|
| 3,577,972 | 5/1971 | Moray | 123/188 P |
| 2,761,438 | 9/1956 | Niess | 123/188 P |
| 2,418,674 | 4/1947 | Steiner | 123/188 P |
| 1,344,347 | 6/1920 | Lee | 123/188 P |
| 3,531,134 | 9/1970 | Kammeraad | 123/188 P |

FOREIGN PATENTS OR APPLICATIONS

| | | | |
|---|---|---|---|
| 199,276 | 0/1938 | Switzerland | 123/188 P |

*Primary Examiner*—Wendell E. Burns
*Assistant Examiner*—A. M. Zupcic
*Attorney*—Theron H. Nichols

[57] ABSTRACT

A new method and two seal mechanisms for carrying out the method are disclosed for preventing oil leaks around valve stems in internal combustion (I.C.) engines having a raised valve guide portion, for the elimination of the smog problem, carbon monoxide, engine sludge, and excess oil usage.

The basic method comprises placing a packing seal on the valve guide raised portion around the valve stem, forming a packing cover over the valve packing and raised portion, and positioning an annular plate under the valve spring and connected to the valve cover for adjusting the pressure on the valve packing without having to remove the valve spring for prevention of leaks from around the valve stem. Another method comprises varying the last step of the basic method as by forming various connections between the valve cover and valve guide raised portion. Two exemplary seal mechanisms are disclosed for carrying out the methods comprising a packing fitted on the seal guide raised portion of the I.C. engine head, a packing cover pressed over the packing, two different connections between the packing cover and the valve guide raised portion, and various annular plates connected to the packing cover and extending out from under the valve spring and having projections for being rotated without removing the valve spring for varying the pressure on the valve stem packing for elimination of oil and oil vapor leaks as the packing wears. The resulting great saving in time and expense provides greater inducement for maintaining the valve seals tight and leak proof for the reduction of the smog problem.

6 Claims, 13 Drawing Figures

PATENTED OCT 24 1972  3,699,942
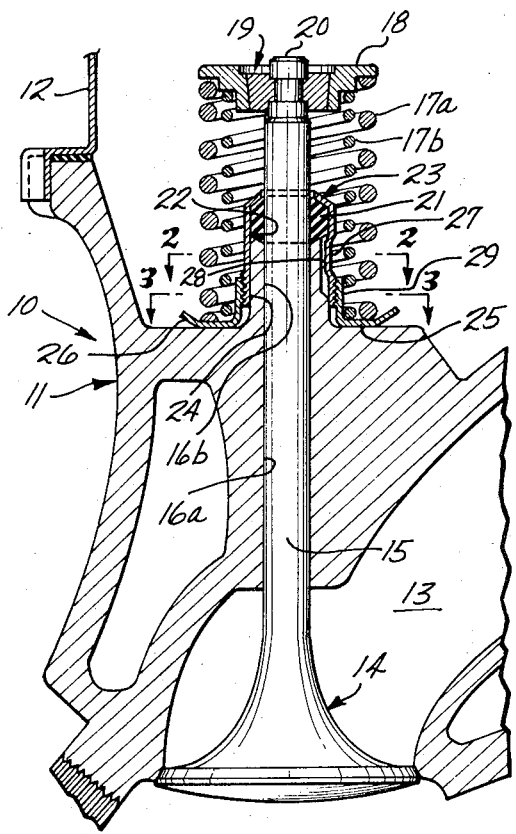
Fig. 1
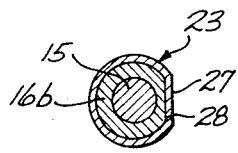
Fig. 2
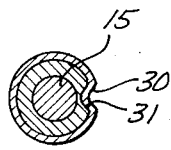
Fig. 2a
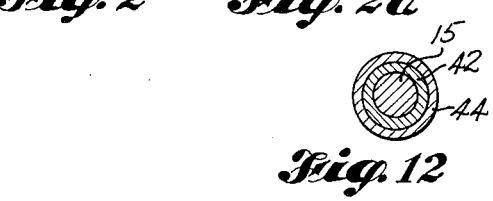
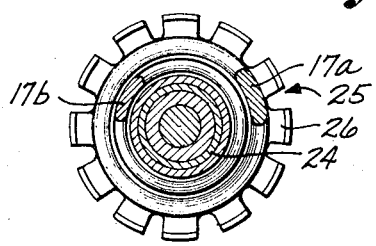
Fig. 3
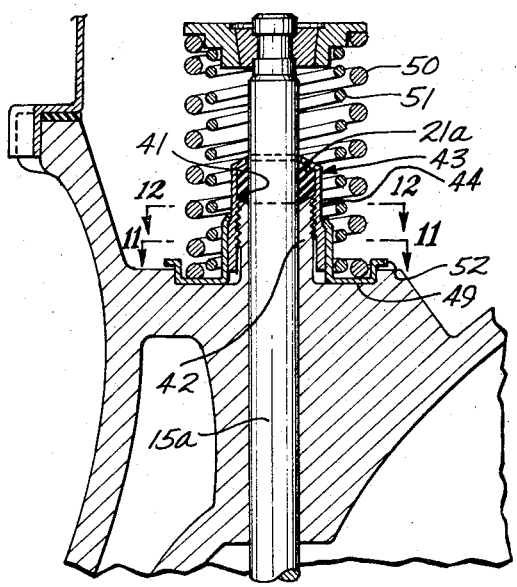
Fig. 9
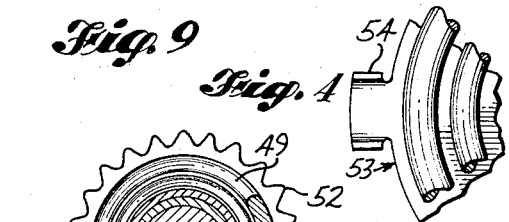
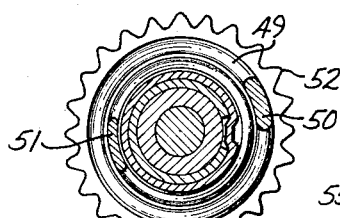
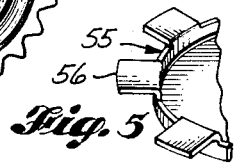
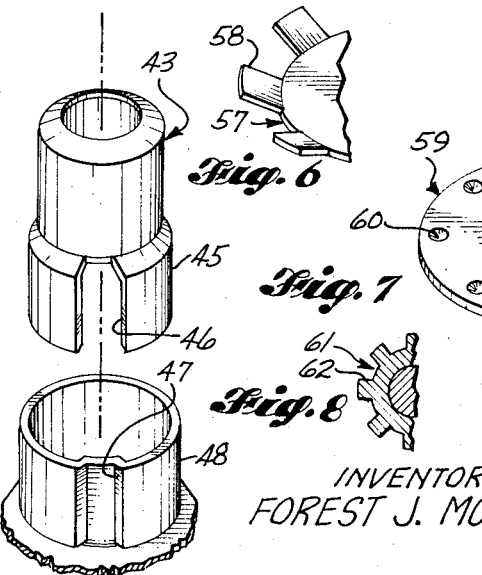
INVENTOR
FOREST J. MORAY
Theron H. Nichols
AGENT

ADJUSTABLE VALVE STEM OIL SEALS FOR OLD AND NEW INTERNAL COMBUSTION ENGINES

SUMMARY OF THE INVENTION

This is a continuation-in-part of Ser. No. 52,175, filed July 6, 1970 now U.S. Pat. No. 3,577,972.

Overhead valves have become very poplar in recent years, particularly in that they enable an engine to deliver more power from a given displacement (cylinder volume) as a result of better valve location.

In the overhead valve engine, to lubricate the rocker arms, rocker arm shafts, push rods, and especially the valve stems, oil must be pumped up to the top of the head and flows freely in all open spaces in the head. Also, on each intake stroke, the vacuum produced pulls in the air and fuel mixture. However or unfortunately, this vacuum also pulls oil down the space between the valve guides and the valve stems and into the combustion chamber, particularly if the sliding fit between the valve stem and valve guide is too loose. This drawing of oil into the combustion chamber is undesirable for several reasons:

1 This oil leaking causes more hydrocarbons to be vented into the atmosphere, aggrivating the smog problem for excessive oil in the combustion chamber produces an unnecessarily large amount of hydrocarbons in the exhaust gases. Hydrocarbons in the atmosphere are reacted upon by sunlight to produce photochemical smog. This type of smog is a severe nuisance in most of our large cities. Tests have verified that approximately 85 percent of the automotive smog is produced by cars over five years old. Since a great percentage of these cars on the road at the present time have overhead valves, it becomes imperative that a means be devised to control the amount of oil entering the combustion chamber by way of the valve guides of these overhead valve engines, as the engine wears with use, without removing and reworking the heads.

2. This can cause detrimental detonations in the engine.

3. An abnormally large amount of oil entering the combustion chamber can more quickly deplete the oil supply in the sump, necessitating the replacement of oil at shorter intervals, at an added expense, and nuisance.

4. Excessive oil in the combustion chamber enriches the air-fuel mixture so that insufficient oxygen remains to completely burn all of the hydrocarbons. The result or by-product of incomplete burning of hydrocarbons is the lethal gas carbon monoxide.

5. Another by-product of internal combustion engines burning excessive rich mixture due to oil leaking in the cylinder is black engine sludge comprising mostly of carbon. This carbon is the result of the breaking down of the resultant hydrocarbons due to the heat of combustion. Due to the insufficiency of oxygen to burn all fuel, excessive carbon results and is washed past the rings by the gasoline into the sump to form sludge. When this sludge clogs up the engine oil passages, insufficient lubrication of vital moving parts results, for example when hydraulic valve lifters clog, valves are caused to burn due to insufficient valve openings.

These valves also require some effort for repairs, such as valve grinding, changing valve packing, etc. However, the overhead valves do adversely effect oil consumption and therefore the smog problem, particularly in that after a few years they become worn and begin to leak. Stopping this leak usually requires complete removal of everything down to the head and including the valve spring, if not the valve itself.

This invention comprises a basic method for stopping oil and oil fume leaks around the valve stem in an engine having raised valve stem guides which is (1) fitting a packing around the valve stem on top of the valve guide raised portion, (2) forming a cover over the valve packing and raised portion and terminating with an end, and (3) positioning an annular plate under the valve spring with the peripheral portion of the annular plate extending out from under the valve spring and with the inner portion of the annular plate connected to the packing cover and for adjusting the pressure on the valve packing without having to remove the valve spring for prevention of leaks from around the valve stem.

The above disclosed basic method comprises two new methods for preventing leaks around a valve stem in an I.C. engine having a valve guide raised portion and a valve spring around the valve comprising the steps of:

1. fitting a valve stem packing on top of the engine valve guide raised portion around the valve stem,
2. forming a cover over the valve packing and raised portion and terminating with an end,
3. forming a tongue and groove connection between the packing cover and the raised portion, and
4. positioning an annular plate under the valve spring with the peripheral portion of the annular plate extending out from under the valve spring and with the inner portion of the annular plate connected to the packing cover end for adjusting the pressure on the valve packing without having to remove the valve spring for prevention of leaks from around the valve stem.

The second method comprises the steps of, 1. fitting a valve stem packing on top of the engine valve guide raised portion around the valve stem,
2. forming a cover over the valve packing and raised portion and terminating with an end,
3. forming a threaded connection between the packing cover and the engine raised portion for guiding the adjustable packing cover in a direction parallel to the valve stem as the pressure is varied on the valve stem packing, and
4. positioning an annular plate under the valve spring with the peripheral portion of the annular plate extending out from under the valve spring and with the inner portion of the annular plate connected to the packing cover end with a tongue and groove connection for adjusting the pressure on the valve packing without having to remove the valve spring for prevention of leaks from around the valve stem.

This invention also comprises a new packing around the valve stem with a variable pressure producing cover thereover, particularly for the overhead valves in an internal combustion engine having raised valve guide portions in the head for carrying out the methods. This new valve packing is easily adjustable during the years of wear whereby the valve spring is not required to be removed. The disclosed seal is adjustable after the valve springs are installed.

One device for carrying out the basic method comprises threading a plate to the lower portion of the packing cover and positioning the plate under the valve spring The peripheral edge of the plate that protrudes out from under the valve spring has radial projections for being rotated for varying the pressure on the packing without removing the valve spring.

Another device for carrying out the basic method comprises threading the packing cover on the raised valve guide portion of the engine head and rotating the cover with a plate connected to the lower end thereon for varying the pressure on the packing for eliminating leakage around the valve stem.

This other device for carrying out the basic method may comprise the utilization of packing cover having a tongue and groove connection with the adjusting plate so that the upper telescopic packing cover portion may be adjusted vertically as the lower telescopic plate portion is rotated as it rests on the engine head.

Thus it is a principal object of this invention to provide a few methods for adjusting the pressure on valve guide seals without removing the valve or the valve springs.

Another principal object of this invention is to provide a valve guide seal that is adjustable during the life of an internal combustion engine by only removing the rocker arm cover or the equivalent, and particularly not requiring removal of the valve and valve springs for adjusting the valve stem packing.

It is another principal object of this invention to provide a valve guide seal having a packing cover screwed on the raised valve guide portion around the valve stem for adjusting the pressure on a valve packing and which packing cover is adjustable from outside the valve spring whereby the pressure on the valve guide seal may be adjusted without removing the valve or valve spring.

A further object of this invention is to provide an adjustable valve packing utilizing a tongue and groove connection between the packing cover and the valve stem guide raised portion of the engine head for guiding the valve packing cover.

Another object of this invention is to provide an adjustable valve stem oil seal that is easy to install on most of the present I.C. engines.

Other objects and various advantages of the disclosed adjustable valve stem oil seal for internal combustion engines will be apparent from the following detailed description, together with the accompanying drawings, submitted for purposes of illustration only.

BRIEF DESCRIPTION OF THE FIGURES

The drawings diagrammatically illustrate by way of example, not by way of limitation, several forms of the invention wherein like reference numerals designate corresponding parts in the several views in which:

FIG. 1 is a schematic sectional view of one embodiment of the new internal combustion engine valve seal;

FIG. 2 is a sectional view at 2—2 on FIG. 1;

FIG. 2a is a sectional view at 2—2 on FIG. 1 of another embodiment of a valve seal;

FIG. 3 is a sectional view at 3—3 on FIG. 1;

FIG. 4 is a plan view of a portion of a modified annular adjusting plate for varying the pressure on the packing;

FIG. 5 likewise discloses a modification of the annular adjusting plate of FIG. 3;

FIG. 6 likewise discloses a modification of the annular adjusting plate of FIG. 3;

FIG. 7 likewise discloses a modification of the annular adjusting plate of FIG. 3;

FIG. 8 also discloses a modification of the annular adjusting plate of FIG. 3;

FIG. 9 is a schematic cross-sectional view of another modification of a valve seal;

FIG. 10 is an exploded view of two telescopic parts of the valve stem cover and gripping means of FIG. 9;

FIG. 11 is a sectional view at 6—6 on FIG. 9; and

FIG. 12 is a sectional view at 7—7 on FIG. 9.

The invention disclosed herein, the scope of which being defined in the appended claims, is not limited in this application to the details of construction and arrangement of parts shown and described, since the invention is capable of other embodiments and of being practiced or carried out in various other ways. Also it is to be understood that the phraseology or terminology employed herein is for the purpose of description and not of limitation.

The disclosed invention pertains to an adjustable valve stem oil seal for I.C. engines having raised valve guides. This new valve stem seal prevents excessive oil from being pulled into the combustion chamber of an overhead valve internal combustion engine by way of the space between the valve stem of a poppet valve and the valve guide in the engine head without the disassembly of the valve assembly. This leakage problem relates particularly to intake valves of engines with overhead valves but not necessarily solely to intake valves. Due to gravity and to the vacuum pulled in the cylinder during the intake stroke, undesired oil is forced into the combustion chamber along with the air-fuel mixture. A new engine presents few problems, but as an internal combustion engine becomes old with use, the oil seals in the valve guides around the valve stems become worn and permit unwanted oil to enter the combustion chamber. The result of the undesirable oil are:

1. Smog is generated by oil burning engines. An abnormally large amount of hydrocarbons in the exhaust gas is generated by excessive oil leaking into the combustion chamber. The hydrocarbons in the atmosphere are reacted upon by sunlight to produce photochemical smog. This type of smog is a great nuisance, particularly to our large cities.

2. Detrimental detonation may be caused by the improper air-fuel mixture.

3. Carbon monoxide is a by-product of too rich an air-fuel mixture with insufficient oxygen in the combustion chamber to completely burn all of the hydrocarbons.

4. Black engine sludge results from excess carbon due to insufficient oxygen to burn all carbon.

5. Excessive oil burning quickly depletes the vital lubricating oil supply.

DESCRIPTION OF THE INVENTION

This invention comprises two new methods for preventing leaks around a valve stem in an I.C. engine having a valve guide raised portion and a valve spring around the valve comprising the steps of:

1. fitting a valve stem packing on top of the engine valve guide raised portion around the valve stem;

2. forming a cover over the valve packing and raised portion and terminating with an end;
3. forming a tongue and groove connection between the packing cover and the raised portion; and
4. positioning an annular plate under the valve spring with the peripheral portion of the annular plate with gripping means, such as projections or prongs extending out from under the valve spring and with the inner portion of the annular plate connected to the packing cover and for adjusting the pressure on the valve packing without having to remove the valve springs for prevention of leaks from around the valve stem.

The second method comprises the steps of,
1. fitting a valve stem packing on top of the engine valve guide raised portion around the valve stem;
2. forming a cover over the valve packing and raised portion and terminating with an end;
3. forming a threaded connection between the packing cover and the engine raised portion for guiding the adjustable packing cover in a direction parallel to the valve stem as the pressure is varied on the valve stem packing, and
4. positioning an annular plate under the valve spring with the peripheral portion of the annular plate with gripping means as projections extending out from under the valve spring and with the inner portion of the annular plate connected to the packing cover end with a tongue and groove connection for adjusting the pressure on the valve packing without having to remove the valve springs for prevention of leaks from around the valve stem.

Valve seals for carrying out these methods are quite different from and are superior seals to one of my former valve seals disclosed in patent application Ser. No. 52,175, filed July 6, 1970. That seal was designed for I.C. engines having a recessed portion in the engine head around the valve stem and included a packing gland which is screwed down on a packing around the valve stem. The instant adjustable valve stem oil seal is useful particularly for the conventional I.C. engine having a raised valve stem guide portion, as illustrated in the mechanical engineering text book "INTERNAL COMBUSTION ENGINES" by Edward F. Obert, published by the International Textbook Company, Scranton, Pennsylvania, December 1968, page 585 for an old Ford tractor I.C. engine and page 7 for a modern I.C. engine. The instant or latter valve stem seal is more suitable in most cases than my former valve stem seal because it is more accessible for installation and removal; it is not affected by the closely positioned water jacket; and it is similar to an extension of the valve guide extending into the valve spring.

FIG. 1 discloses schematically one embodiment of the invention wherein an engine, such as but not limited to an I.C. overhead valve engine 10 illustrated as having head 11 with a valve cover 12, and intake 13 controlled by overhead intake valve 14 having a stem 15 slideable in valve guide 16a having a raised portion 16b as controlled by outer and inner valve springs 17a and 17b. A valve spring retainer 18 having split locking ring 19 secures the valve springs 17a and 17b to the outer end 20 of the valve stem 15. All the above described elements are conventional.

The inventive elements in combination with the above elements for producing the new and unobvious seal are as follows. A valve packing 21, FIG. 1, around valve stem 15 is positioned in a recess 22 formed on top of valve guide raised portion 16b. Adjustably retaining packing 21 around valve stem 15 is valve packing cover 23 pressed thereover and extending inwardly towards the engine head to terminate with a threaded cylindrical end 24. An annular plate gripping means 26 encircles the raised valve guide portion 16b with a threaded circumcolumnar 29 for adjustably securing the valve packing cover inner end 24 thereto. Annular plate 25 extends out from under the valve springs 17a, 17b to terminate with friction engaging means, as peripheral prongs 26, or the like, as seen in FIG. 3 particularly.

A flat surface 27, FIGS. 1 and 2, is formed on packing cover 23 for sliding over a corresponding flat surface 28 formed or ground on the cylindrical surface of the valve guide raised portion 16b, FIG. 1, or particularly as illustrated in FIG. 2. If so required and desired a tongue 30, FIG. 2a, and groove 31, may be utilized between the valve packing cover 23 and the raised portion 16b, respectively, for providing vertical movement with no rotation of the packing cover. Thus, with rotation of the plate 25 by applying a screwdriver to the prongs 26, the plate 25 rotates to raise or lower the valve packing cover 23 to vary the pressure on packing 21 without removing the valve spring for the easy adjustment in the engine valve packing for the prevention of leaks of oil or oil vapor therefrom.

FIG. 2, a cross-sectional view at 2—2 on FIG. 1, illustrates the flat portion 27 formed on the cylindrical surface of the valve packing cover 23 contiguous with the flat surface 28 formed on the cylindrical surface of the valve guide raised portion 16b for preventing rotation of the packing cover as it raises or lowers due to the threaded connection 24, FIG. 1, with the rotatable plate 25.

The embodiment of FIG. 2a, a modification of the embodiment of FIG. 2, encludes a tongue and groove connection in place of the flat surfaces 27 and 28 of FIG. 2, wherein tongue or raised projection 30 on the packing cover 23 rides in groove 31 in the raised portion 16b for guiding the packing cover axially of the valve stem with rotation of the annular plate 23.

FIG. 3, a cross-sectional view at 3—3 on FIG. 1 illustrates the friction means or prongs 26 on the periphery of plate 25 for turning thereof from externally of valve springs 17a and 17b with a tool, as a screwdriver or the like. Thus, rotation of plate 25 raises or lowers valve cover lower end 24 because of the threaded connection with the telescopic cylindrical portion 29 on the inner periphery of the plate 25.

FIG. 4 is a plan view of a portion of a modified annular adjusting plate 53 for varying the pressure on the packing 21. This adjusting plate 53 with friction engaging means or projections 54 having upwardly curved sides for being contacted with a suitable tool, as a screwdriver, for rotating the annular plate for screwing the valve packing cover 23 down on the valve stem packing 21, FIG. 1, for varying the pressure thereon is similar to the adjusting plate of FIG. 4 of inventor's copending parent patent application identified above.

FIG. 5, which discloses another modification of the annular adjusting plat 25 of FIG. 3, comprising a shallow dish shaped annular plate 55 having friction engaging means comprising flat radial prongs 56 similar to those disclosed in FIG. 6 of inventor's above identified application.

FIG. 6, a modification of FIG. 5 and similar to the disclosure of FIG. 2 of the inventor's above identified application, comprises a disk like annular plate 57 having upward titlted prongs 58 as the friction engaging means for being contacted with the tool for adjusting the pressure on the packing 21, FIG. 1.

FIG. 7 discloses a disk shaped annular plate 59 having recesses 60 as the friction engaging means for being engaged with a sharp tool as a punch, or the like, for rotation and adjustment of the valve packing cover 23 of FIG. 1. This adjusting plate 59 likewise is similar to that of FIG. 7 of applicant's above identified application.

FIG. 8 is a plan view of a portion of a modified annular adjusting plate 61 having radial projections 62 as the friction engaging means similar to that disclosed in FIG. 11 of applicant's above identified application for rotating valve packing cover 23, FIG. 1 of the instant disclosure to vary the pressure on packing 21. This annular plate is one of the most economical to stamp out for manufacturing.

FIG. 9 discloses a modification of the embodiment disclosed in FIG. 1 having valve stem packing 21a resting on a recess 41 in the top of valve stem guide raised portion 42 around valve stem 15a.

FIG. 10 shows schematically the lower or inner end 45 of packing cover 43 comprising a skirt with a slot 46 therein for receiving a ridge 47 in a telescopic cylindrical portion or circumcolumnar 48 of the adjusting annular plate 49, FIG. 11.

FIG. 11, a cross-sectional view taken at 11—11 on FIG. 9 discloses annular plate 49 being positioned under valve springs 50 and 51 and being adjustably rotateable by prongs 52 on the peripheral edge of the plate. Thus by rotating prongs 52 with a screwdriver, or the like, without having to remove the valve springs, the plate 49 is rotated, the cylindrical portion 48, FIG. 10, is rotated, the inner end 45, and the packing cover 43 is rotated on threaded valve guide raised portion 42, FIG. 9, to vary the pressure on packing 40 for stoppage of all leaking from around the valve stem.

FIG. 12 is a cross-sectional view on 12—12 of FIG. 9 illustrating the valve stem guide 42 around valve stem 15a with all covered and circumscribed by packing cover intermediate portion 44.

Accordingly it is clearly seen that the disclosed methods and valve stem seals for an internal combustion engine are very effective and easy to adjust by only removing the valve cover and not the valve springs and are operable in a manner which meets each of the objects set forth hereinbefore.

While only two methods and a few embodiments for carrying out the methods of the invention are disclosed in the accompanying specification and drawings, it will be evident that various other modifications are possible in the arrangement and construction of the disclosed adjustable valve stem oil seal without departing from the scope of the invention, and it is accordingly desired to comprehend within the purview of this invention such modifications as may be considered to fall within the scope of the appended claims.

I claim:

1. A seal for a valve stem in an engine wherein the engine has a raised valve guide portion around the valve stem and a valve spring for being positioned around the valve stem and raised portion, the seal comprising,
   a. a valve stem packing on said raised portion,
   b. a packing cover movable parallel to said valve stem on said raised portion and pressing against the packing,
   c. connecting means between said packing cover and said raised valve guide portion for permitting vertical movement of said packing cover while preventing rotational movement thereof,
   d. gripping means connected to one end portion on the packing cover and extending externally of the valve spring for being easily actuated periodically for causing movement of the packing cover parallel to the valve stem for adjusting the pressure of the packing cover on the packing for prevention of excess oil leakage from around the valve stem as the packing wears without having to remove the valve spring from the valve,
   e. connecting means between said packing cover and said gripping means for moving said packing cover vertically with the actuation of said gripping means for varying the pressure on said packing, and
   f. said packing cover being responsive to said gripping means for varying the pressure on said packing with actuation of said gripping means.

2. A seal as recited in claim 1 wherein,
   a. said connecting means between said packing cover and said raised valve guide portion comprises vertical tongue and groove connecting means for limiting said packing cover to vertical movement relative to said raised portion with rotation of gripping means.

3. A seal as recited in claim 1 wherein,
   a. said connecting means between said packing cover and said raised valve guide portion comprising a groove on said raised portion and corresponding projection on said packing cover operable in said groove limiting said packing cover to vertical movement relative to said raised portion with rotation of said gripping means.

4. A seal as recited in claim 1 wherein,
   a. said connecting means between said packing cover and said raised valve guide portion comprising two corresponding flat surfaces on cylindrical surfaces on each of said packing cover and said raised portion for limiting said packing cover to vertical movement relative to said raised portion with rotation of said gripping means.

5. A seal as recited in claim 1 wherein,
   a. said connecting means between said packing cover and said gripping means being a threaded connection between vertical telescopic portions of both said packing cover and said gripping means.

6. A seal for a valve stem in an engine wherein the engine has a raised valve guide portion around the valve stem and a valve spring adapted to be positioned around the valve stem and raised portion, the seal comprising,
   a. valve stem packing on said raised portion,
   b. a packing cover movable parallel to said valve stem on said raised portion and pressing against the packing, c. a first flat surface is formed on one side of said head raised portion,
d. said packing cover has a second flat surface corresponding to said first flat surface, said first and second flat surfaces being contiguous with each other for permitting vertical movement of said packing cover relative to said raised portion while preventing relative rotation between said packing cover and said raised portion,
e. gripping means connected to one end portion of the packing cover and extending externally of the valve spring for being easily actuated periodically for causing movement of the packing cover parallel to the valve stem for adjusting the pressure of the packing cover on the packing for prevention of excessive oil leakage from around the valve stem as the packing wears without having to remove the valve spring from the valve,
f. threaded interconnection means between said packing cover and said gripping means, and
g. said packing cover being responsive to rotation of said gripping means for maintaining pressure on said packing for preventing excessive oil leakage around said valve stem.

* * * * *